United States Patent [19]

Hashiguchi et al.

[11] Patent Number: 5,270,274
[45] Date of Patent: Dec. 14, 1993

[54] CATALYST COMPOSITION FOR HYDROGENATING OLEFINICALLY UNSATURATED POLYMERS

[75] Inventors: Yoshiharu Hashiguchi, Mie; Takashi Ishida, Yokkaichi; Hiroyuki Sasanuma, Yokkaichi; Yasuhiko Takemura, Yokkaichi, all of Japan

[73] Assignee: Japan Synthetic Rubber Co., Ltd., Tokyo, Japan

[21] Appl. No.: 981,288

[22] Filed: Nov. 25, 1992

[30] Foreign Application Priority Data

| Nov. 28, 1991 | [JP] | Japan | 3-338019 |
| Jan. 29, 1992 | [JP] | Japan | 4-36987 |
| Jan. 29, 1992 | [JP] | Japan | 4-36988 |
| Jan. 29, 1992 | [JP] | Japan | 4-36989 |
| Sep. 1, 1992  | [JP] | Japan | 4-233185 |

[51] Int. Cl.$^5$ ............................................ C08F 4/60
[52] U.S. Cl. .................................... 502/115; 502/103; 502/117
[58] Field of Search ............... 502/103, 104, 117, 109, 502/152, 115

[56] References Cited

U.S. PATENT DOCUMENTS

| 4,501,857 | 2/1985  | Kishimoto et al.  | 525/338 |
| 4,980,421 | 12/1990 | Teramoto et al.   | 525/339 |
| 5,169,905 | 12/1992 | Hashiguchi et al. | 525/338 |

Primary Examiner—Patrick P. Garvin
Assistant Examiner—Brent M. Peebles
Attorney, Agent, or Firm—Oblon, Spivak, McClelland, Maier & Neustadt

[57] ABSTRACT

A catalyst composition comprising: (a) a bis(cyclopentadienyl) transition metal compound, (b) at least one polarized compound selected from the group consisting of carbonyl group-containing compounds and epoxy group containing compounds, and (c) an organic lithium compound. It has a high hydrogenation activity and is useful for hydrogenating olefinically unsaturated polymers for providing the olefinically unsaturated polymers with excellent characteristics as superior weatherability, good heat resistance, superb oxidation resistance, and the like.

9 Claims, No Drawings

CATALYST COMPOSITION FOR HYDROGENATING OLEFINICALLY UNSATURATED POLYMERS

BACKGROUND OF THE INVENTION

1. Field of the Invention

The present invention relates to a catalyst composition for hydrogenating olefinically unsaturated polymers, and, more particularly, to a catalyst composition having a high hydrogenation activity and useful for hydrogenating olefinically unsaturated polymers for providing the olefinically unsaturated polymers with excellent characteristics as superior weatherability, good heat resistance, superb oxidation resistance, and the like.

2. Description of the Background Art

Olefinically unsaturated polymers typified by conjugated diene polymers are widely used in industries as elastomers and the like.

The olefinically unsaturated bonds in these polymers are advantageously used in vulcanization and the like. However, they are causes for impairing weatherability, heat resistance, or the like of the polymers, imposing limitations to their application.

The poor weatherability, heat resistance, and the like can be remarkably improved by saturating the olefinically unsaturated bonds in the polymer chains by hydrogenating the polymers.

For hydrogenating polymers containing the olefinically unsaturated bonds, there are known (1) a process using an unhomogeneous catalyst composition in which a metal such as nickel, platinum, palladium, or the like is supported by a carrier such as carbon, silica, alumina, or the like, and (2) a process using a homogeneous catalyst composition prepared by reacting an organometal compound, e.g., an organic compound of metals such as nickel, cobalt, titanium, or the like, and a reducing compound, such as organic aluminum compound, organic magnesium compound, organic lithium compound, or the like, in a solvent.

The unhomogeneous catalyst supported by a carrier used in the above process (1) generally has a lower activity than the homogenous catalyst composition and thus requires more severe conditions, in terms of temperature, pressure, and the like, for effecting the hydrogenation reaction. A hydrogenation reaction proceeds through the contact of the feed materials and the catalyst. However, in the hydrogenation of polymers, the polymers are more difficult to come contact with the catalyst than lower molecular weight hydrogenation feed materials due to their high viscosity in the reaction system, steric hindrance of the polymers, and the like. Effective hydrogenation of polymers, therefore, requires a large amount of catalysts, involving a high production cost, and demands high temperature and pressure in the hydrogenation reaction, which may not only decompose the polymers or cause gelation, but also increase energy consumption. Furthermore, if the feed polymer is a copolymer of a conjugated diene and a vinyl-substituted hydrocarbon, it is difficult to selectively hydrogenating the unsaturated bonds in conjugated diene units, since, in general, aromatic rings are also hydrogenated at the same time.

In the above process (2) in which a homogeneous catalyst is used the hydrogenation reaction generally proceeds in a uniform system, wherein the catalyst is more active than in the unhomogeneous supported catalyst. Thus, the process can be operated with a smaller amount of catalyst and under a lower temperature and pressure.

If appropriate hydrogenation reaction conditions are adopted, it is possible to selectively hydrogenate the unsaturated double bonds in conjugated diene units of a copolymer of a conjugated diene and a vinyl-substituted hydrocarbon. A problem with the homogeneous catalyst composition is its poor reproducibility due to a significant variation in the hydrogenation activity depending on the reducing conditions of the catalyst composition, making it difficult to constantly produce polymers with a high degree of hydrogenation. Furthermore, the homogeneous catalyst composition loses its hydrogenation activity by impurities in the reaction system, since its components are apt to be inactivated by the impurities. This is another cause of the poor reproducibility of the homogeneous catalyst composition. Inability of constantly producing highly hydrogenated polymers with good reproducibility is a great stumbling block for the industrial application of the hydrogenation reaction using the homogeneous catalyst composition for the promotion of weatherability and heat resistance of polymers.

Furthermore, the rate of hydrogenation reactions using conventional homogeneous catalyst in the hydrogenation of polymers is not sufficiently high. In addition, the hydrogenation reaction rate decreases depending on the reducing conditions of the catalyst or due to impurities existing in the reaction system. Thus, there have been problems in hydrogenating polymers in an industrial scale by using homogeneous catalyst.

There is therefore a strong desire for the development of a high activity hydrogenation catalyst composition which is not affected by impurities in the reaction system, while producing highly hydrogenated polymers at a high rate and in a stable manner, without regard to the conditions under which it is prepared.

A hydrogenation reaction using a bis(cyclopentadienyl) transition metal compound as a catalyst component is known in the art, e.g., M. F. Sloan, et al., J. Am. Chem. Soc., 85, 4014–4018 (1965); Y. Tajima, et al., J. Org. Chem., 33, 1689–1690 (1968); Japanese Patent Laid-open (ko-kai) Nos. 133203/1984, 28507/1986, etc.

No technology heretofore known in the art, however, could solve the above-mentioned problems. There have been no publications disclosing or suggesting a solution to the problems.

SUMMARY OF THE INVENTION

The present invention has been achieved in order to solve the above problems in the conventional technology. It has an object of providing a catalyst composition capable of selectively hyirogenating olefinically unsaturated bonds in polymer chains at a high rate under mild conditions and thus capable of constantly producing highly hydrogenated polymers, while maintaining an extremely high activity without being affected by impurities in the reaction system.

The above object can be achieved according to the present invention by a catalyst composition for hydrogenating olefinically unsaturated polymers, which comprises:

(a) a bis(cyclopentadienyl) transition metal compound represented by the following formula (1),

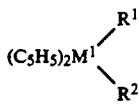

(1)

wherein $M^1$ is a transition metal selected from the group consisting of titanium, zirconium, and hafnium, $R^1$ and $R^2$ may be the same or different and each represents an alkyl group, aryl group, aralkyl group, alkoxy group, aryloxy group, carboxyl group, carbonyl group, $\beta$-diketone cordination group, or a halogen atom, (b) at least one polarized compound selected from the group consisting of carbonyl group-containing compounds and epoxy group containing compounds, and (c) an organic lithium compound.

In a preferred embodiment of the present invention, the above catalyst composition further comprises, in addition to components (a), (b), and (c), (d) a reducing organometal compound selected from the group consisting of aluminum compounds, zinc compounds, and magnesium compounds.

In another preferred embodiment of the present invention, the above catalyst composition comprises component (a), a reaction product of components (b) and (c), and component (d); or a reaction product of components (a), (b), and (c) and component (d).

Other objects, features and advantages of the invention will hereinafter become more readily apparent from the following description.

DETAILED DESCRIPTION OF THE INVENTION AND PREFERRED EMBODIMENTS

In the present invention, especially preferred are compounds of formula (1) having one or two groups selected from alkyl group, aryl group, aralkyl group, alkoxy group, aryloxy group, carboxyl group, and a halogen atom for $R^1$ and $R^2$, and, in particular, those having alkyl group, aryl group, aralkyl group, alkoxy group, or a halogen atom for $R^1$ and $R^2$.

The following compounds are given as specific examples of bis(cyclopentadienyl) transition metal compounds used in the present invention as component (a).
Bis(cyclopentadienyl) titanium dimethyl,
bis(cyclopentadienyl) titanium diethyl,
bis(cyclopentadienyl) titanium di-n-butyl,
bis(cyclopentadienyl) titanium di-sec-butyl,
bis(cyclopentadienyl) titanium dihexyl,
bis(cyclopentadienyl) titanium dioctyl,
bis(cyclopentadienyl) titanium dimethoxide,
bis(cyclopentadienyl) titanium diethoxide,
bis(cyclopentadienyl) titanium dibutoxide,
bis(cyclopentadienyl) titanium diphenyl,
bis(cyclopentadienyl) titanium di-m-tolyl,
bis(cyclopentadienyl) titanium di-p-tolyl,
bis(cyclopentadienyl) titanium di-2,4-xylyl,
bis(cyclopentadienyl) titanium di-4-ethylphenyl,
bis(cyclopentadienyl) titanium di-4-butylphenyl,
bis(cyclopentadienyl) titanium di-4-hexylphenyl,
bis(cyclopentadienyl) titanium diphenoxide,
bis(cyclopentadienyl) titanium difluoride,
bis(cyclopentadienyl) titanium dichloride,
bis(cyclopentadienyl) titanium dibromide,
bis(cyclopentadienyl) titanium diiodide,
bis(cyclopentadienyl) titanium dicarbonyl,
bis(cyclopentadienyl) methyl titanium chloride,
bis(cyclopentadienyl) methoxy titanium chloride,
bis(cyclopentadienyl) ethoxy titanium chloride,
bis(cyclopentadienyl) i-propoxy titanium chloride,
bis(cyclopentadienyl) phenoxy titanium chloride,
bis(cyclopentadienyl) titanium dibenzyl,
bis(cyclopentadienyl) titanium diacetate,
bis(cyclopentadienyl) titanium diacetylacetonate,
bis(cyclopentadienyl) zirconium dimethyl,
bis(cyclopentadienyl) zirconium diethyl,
bis(cyclopentadienyl) zirconium di-n-butyl,
bis(cyclopentadienyl) zirconium di-sec-butyl,
bis(cyclopentadienyl) zirconium dihexyl,
bis(cyclopentadienyl) zirconium dioctyl,
bis(cyclopentadienyl) zirconium dimethoxide,
bis(cyclopentadienyl) zirconium diethoxide,
bis(cyclopentadienyl) zirconium dibutoxide,
bis(cyclopentadienyl) zirconium diphenyl,
bis(cyclopentadienyl) zirconium di-m-tolyl,
bis(cyclopentadienyl) zirconium di-p-tolyl,
bis(cyclopentadienyl) zirconium di-2,4-xylyl,
bis(cyclopentadienyl) zirconium di-4-ethylphenyl,
bis(cyclopentadienyl) zirconium diphenoxide,
bis(cyclopentadienyl) zirconium difluoride,
bis(cyclopentadienyl) zirconium dichloride,
bis(cyclopentadienyl) zirconium dibromide,
bis(cyclopentadienyl) zirconium diiodide,
bis(cyclopentadienyl) zirconium dicarbonyl,
bis(cyclopentadienyl) methyl zirconium chloride,
bis(cyclopentadienyl) hafnium dimethyl,
bis(cyclopentadienyl) hafnium diethyl,
bis(cyclopentadienyl) hafnium di-n-butyl,
bis(cyclopentadienyl) hafnium di-sec-butyl,
bis(cyclopentadienyl) hafnium dihexyl,
bis(cyclopentadienyl) hafnium dimethoxide,
bis(cyclopentadienyl) hafnium diethoxide,
bis(cyclopentadienyl) hafnium dibutoxide,
bis(cyclopentadienyl) hafnium diphenyl,
bis(cyclopentadienyl) hafnium di-m-tolyl,
bis(cyclopentadienyl) hafnium di-p-tolyl,
bis(cyclopentadienyl) hafnium di-2,4-xylyl,
bis(cyclopentadienyl) hafnium diphenoxide,
bis(cyclopentadienyl) hafnium difluoride,
bis(cyclopentadienyl) hafnium dichloride,
bis(cyclopentadienyl) hafnium dibromide,
bis(cyclopentadienyl) hafnium diiodide,
bis(cyclopentadienyl) hafnium dicarbonyl, and The above compounds can be used either singly or in combination.

Among the above bis(cyclopentadienyl) transition metal compounds, those having a high hydrogenation activity for olefinically unsaturated bonds in polymers and capable of selectively hydrogenating the unsaturated bonds under mild conditions are the following compounds.
Bis(cyclopentadienyl) titanium dimethyl,
bis(cyclopentadienyl) titanium di-n-butyl,
bis(cyclopentadienyl) titanium dichloride,
bis(cyclopentadienyl) titanium diphenyl,
bis(cyclopentadienyl) titanium di-p-tolyl,
bis(cyclopentadienyl) titanium dicarbonyl,
bis(cyclopentadienyl) titanium dibenzyl,
bis(cyclopentadienyl) i-propoxy titanium chloride,
bis(cyclopentadienyl) zirconium dichloride,
bis(cyclopentadienyl) zirconium dibromide,
bis(cyclopentadienyl) zirconium diphenyl,
bis(cyclopentadienyl) zirconium p-tolyl,
bis(cyclopentadienyl) hafnium dichloride,
bis(cyclopentadienyl) hafnium dibromide, bis(cyclopentadienyl) hafnium diphenyl,
bis(cyclopentadienyl) hafnium p-tolyl.

Of the above compounds, especially preferred for the purpose of the present invention are:
bis(cyclopentadienyl) titanium dichloride,
bis(cyclopentadienyl) titanium diphenyl,
bis(cyclopentadienyl) titanium di-p-tolyl,
bis(cyclopentadienyl) titanium dibenzyl,
bis(cyclopentadienyl) i-propoxy titanium chloride,
bis(cyclopentadienyl) zirconium dichloride,
bis(cyclopentadienyl) zirconium diphenyl,
bis(cyclopentadienyl) zirconium p-tolyl,
bis(cyclopentadienyl) hafnium dichloride,
bis(cyclopentadienyl) hafnium diphenyl, and
bis(cyclopentadienyl) hafnium p-tolyl.

Ketone compounds, hydroxy group-containing ketone compounds, aldehyde compounds, ester compounds, lactone compounds, lactam compounds, and epoxy compounds are given as polarized carbonyl group-containing compounds and epoxy group-containing compounds used as component (b) in the present invention.

Of the above compounds, especially preferred are ketone compounds, hydroxy group-containing ketone compounds, aldehyde compounds, lactone compounds, lactam compounds, and epoxy compounds.

Specific examples of preferred ketone compounds include acetone, diethyl ketone, di-n-propyl ketone, di-i-propyl ketone, di-n-butyl ketone, di-sec-butyl ketone, di-t-butyl ketone, methyl ethyl ketone, i-propyl methyl ketone, i-butyl methyl ketone, 2-pentanone, 3-hexanone, 3-decanone, diacetyl, acetophenone, 4,-methoxy acetophenone, 4'-methyl acetophenone, propiophenone, benzophenone, 4-methoxy benzophenone, 4,4'-dimethoxy benzophenone, benzyl phenyl ketone, benzil acetone, benzil, benzoyl acetone, cyclopentanone, cyclohexanone, 4-methyl cyclohexanone, 1,2-cyclohexane dione, cycloheptanone, acetyl acetone, and the like.

Hydroxy group-containing ketone compounds are defined as compounds having both a hydroxy group and a ketone carbonyl group in the molecule. Specific examples of preferable compounds are hydroxyacetone, acetoin, 4-hydroxy-2-butanone, 3-hydroxy-3-methyl-2-butanone, 5-hydroxy-2-butanone, diacetone alcohol, 4-(p-hydroxyphenyl)-2-butanone, 2-hydroxyacetophenone, 2'-hydroxyacetophone, 2'-hydroxyacetophenone, 3'-hydroxyacetophenone, 4'-hydroxyacetoacetophenone, 3,-hydroxy-3'-methoxyacetophenone, 2-hydroxyphenyl ethyl ketone, 4'-hydroxypropiophenone, 2',4,-dihydroxyacetophenone, 2',5'-dihydroxyacetophenone, 2',6'-dihydroxyacetophenone, 3', 5'-dihydroxyacetophenone, 2',3',4'trihydroxyacetophenone, 2-hydroxybenzophenone, 4-hydroxybenzophenone, 2-hydroxy-4-methoxybenzophenone, 2-hydroxy-4-n-octyloxybenzophenone, 2,2,-dihydroxybenzophenone, 2,4-dihydroxybenzophenone, 4,4'-dihydroxybenzophenone, 2,2'-dihydroxy-4-methoxybenzophenone, 2,4,4'trihydroxybenzophenone, benzoin, and the like.

As aldehyde compounds, either aliphatic or aromatic aldehyde compounds can be used. The aliphatic group in aliphatic aldehyde compounds may be either saturated or unsaturated and either linear or branched. Given as examples of preferable aldehyde compounds are formaldehyde, acetaldehyde, propionaldehyde, n-butylaldehyde, i-butylaldehyde, n-valeraldehyde, i-valeraldehyde, pivalaldehyde, n-capronaldehyde, 2-ethylhexylaldehyde, n-heptaldehyde, n-caprylaldehyde, pelargonaldehyde, n-caprinaldehyde, n-undecylaldehyde, laurylaldehyde, tridecylaldehyde, myristylaldehyde, pentadecylaldehyde, palmitylaldehyde, margarylaldehyde, stearylaldehyde, glyoxal, succinaldehyde, benzaldehyde, o-tolualdehyde, m-tolualdehyde, p-tolualdehyde, α-naphthaldehyde, β-naphthaldehyde, phenylacetnaphthaldehyde, and the like.

Examples of ester compounds are esters formed by a monobasic acid, e.g., formic acid, acetic acid, propionic acid, butyric acid, capronic acid,, pelargonic acid, lauric acid, palmitic acid, stearic acid, isostearic acid, cyclohexylpropionic acid, cyclohexylcapronic acid, benzoic acid, phenylbutyric acid, etc., a dibasic acid, e.g., oxalic acid, maleic acid, malonic acid, fumaric acid, succinic acid, glutaric acid, adipic acid, pimeric acid, suberic acid, sebacic acid, itaconic acid, phthalic acid, isophthalic acid, terephthalic acid, diphenic acid, azelaic acid, etc., or a polybasic acid, e.g., 1,2,3-propanetricarboxylic acid, 1,3,5-n-pentanetricarboxylic acid, etc, and an alcohol, e.g., methyl alcohol, ethyl alcohol, isopropyl alcohol, n-butyl alcohol, sec-butyl alcohol, tert-butyl alcohol, amyl alcohol, hexyl alcohol, octyl alcohol, phenol, cresol, 1,3-butanediol, 1,4-butanediol, pinacol, pentaerythritol, etc.

Specific examples of lactone compounds are β-propiolactone, γ-butyrolactone, ε-caprolactone, Δα, β-crotonlactone, Δβγ-crotonlactone, coumarin, phthalide, α-pyrone, sydonone, fluoran, and the like.

Given as specific examples of lactam compounds are β-propiolactam, 2-pyrrolidone, 2-piperidone, ε-caprolactam, n-heptanelactam, 8-octanelactam, 9-nonanelactam, 10-decanelactam, 2-quinolone, 1-isoquinolone, oxindole, isoindigo, isatin, hydantoin, quinolidinone, and the like.

Specific examples of preferable epoxy compounds include 1,3-butadiene monoxide, 1,3-butadiene dioxide, 1,2-butylene oxide, 2,3-butylene oxide, cyclohexene oxide, 1,2-epoxy cyclododecane, 1,2-epoxy decane, 1,2-epoxy eicosane, 1,2-epoxy heptane, 1,2-epoxy hexadecane, 1,2-epoxy octadecane, 1,2-epoxy octane, ethylene glycol diglycidyl ether, 1,2-epoxy tetradecane, hexamethylene oxide, isobutylene oxide, 1,7-octadiene diepoxide, 2-phenylpropylene oxide, propylene oxide, trans-stilbene oxide, styrene oxide, epoxylated 1,2-polybutadiene, epoxylated linseed oil, glycidyl methyl ether, glycidyl n-butyl ether, glycidyl allyl ether, glycidyl methacrylate, glycidyl acrylate, and the like.

Given as specific examples of organic lithium compounds, component (c) of the catalyst composition of the present invention, are methyl lithium, ethyl lithium, n-propyl lithium, n-butyl lithium, sec-butyl lithium, t-butyl lithium, n-hexyl lithium, phenyl lithium, p-tolyl lithium, xylyl lithium, 1,4-dilithiobutane, alkylene dilithium, a reaction product butyl lithium and divinylbenzene, and the like. Beside these low molecular weight organic lithium compounds, living polymers having lithium at their terminals can be used as component (c).

Of the above lithium compounds, particularly preferred are n-butyl lithium, sec-butyl lithium, t-butyl lithium, phenyl lithium, and living polymers having lithium at their terminals.

The hydrogenation catalyst composition of the present invention comprises the above components (a), (b), and (c); but may further comprise component (d).

As component (d), a reducing organic metal compound selected from the group consisting of aluminum compounds, zinc compounds, and magnesium compounds can be used. Given as specific examples are; as aluminum compounds, trimethyl aluminum, triethyl aluminum, tri-i-butyl aluminum, triphenyl aluminum, diethyl aluminum chloride, ethyl aluminum dichloride, methyl aluminum sesquichloride, ethyl aluminum sesquichloride, diethyl aluminum hydride, di-i-butyl aluminum hydride, tri(2-ethylhexyl) aluminum, aluminum tri-i-propoxide, aluminum tri-t-butoxide, diethyl aluminum ethoxide, and the like; as zinc compounds, diethyl zinc, bis(cyclopentadienyl) zinc, diphenyl zinc, and the like; and as magnesium compounds, dimethyl magnesium, diethyl magnesium, methyl magnesium bromide, methyl magnesium chloride, ethyl magnesium bromide, ethyl magnesium chloride, phenyl magnesium bromide, phenyl magnesium chloride, t-butyl magnesium chloride, and the like.

Beside these compounds, compounds containing two or more reducing metals, such as lithium aluminum hydride, can be used as component (c).

Of the above compounds, triethyl aluminum, tri-i-butyl aluminum, diethyl aluminum chloride, ethyl aluminum dichloride, aluminum tri-i-propoxide, and aluminum tri-t-butoxide are preferred from the aspect of their ready availability and handling easiness.

Regarding the proportions of the above components to be used in the catalyst composition of the present invention, the molar ratio of component (a) to component (b), (a)/(b), is smaller than 1/0.5, preferably 1/1.5–1/50, and more preferably ½–1/30. If the amount of component (b) for 1 mole of component (a) is smaller than 0.5 mole, the catalyst activity is insufficient, making it difficult to hydrogenate polymers under mild conditions.

A preferable molar ratio of component (a) to component (c), (a)/(c), is 1/1–1/40, with more preferable ratio being ½–1/35, and most preferable ration being ½–1/30. If the amount of component (c) for 1 mole of component (a) is smaller than 1 mole, the hydrogenation reaction proceeds very slowly; if greater than 40 moles, gelation or side reactions of polymers may occur, even though the catalyst composition maintains the hydrogenation activity.

With respect to the proportion of components (b) and (c), when component (b) is a ketone compound or an aldehyde compound, the equivalent ratio of the ketonic carbonyl group or the aldehyde carbonyl group in component (b) to the lithium atom of component (c) is 0.5–2, preferably 0.7–1.7, more preferably greater than 1 and less than 1.5. A particularly preferable range of this ratio is greater than 1 and less than 1.2, with the range greater than 1 and less than 1.1 being ideal. In the determination of the equivalent ratio, 1 mole of a compound containing 2 ketonic carbonyl or aldehyde carbonyl groups in a molecule is counted to be 2 equivalent; if 3 of these groups are contained in a molecule, 1 mole of the compound is 3 equivalent.

When component (b) is a ketone compound containing a hydroxy group, the equivalent ratio of the hydroxy group plus ketonic carbonyl group in component (b) to the lithium atom of component (c) is 0.5–2, preferably 1–1.5, more preferably greater than 1 and less than 1.2. The ratio greater than 1 and less than 1.1 is ideal. In the determination of the equivalent ratio, 1 mole of a compound containing 2 hydroxy or ketonic carbonyl groups in total in a molecule is counted to be 2 equivalent; if 3 of these groups are contained in a molecule, 1 mole of the compound is 3 equivalent.

Regarding the proportion of components (b) and (c) when component (b) is an ester compound, the equivalent ratio of the ester group in component (b) to the lithium atom of component (c) is less than 1, preferably 0.5–0.75, more preferably greater than 0.5 and less than 0.65. The ratio greater than 0.5 and less than 0.6 is particularly preferable. In the determination of the equivalent ratio, 1 mole of a compound containing 1 ester group in a molecule is counted to be 2 equivalent; if 2 ester groups are contained in a molecule, 1 mole of the compound is 4 equivalent.

When component (b) is a lactone or lactam compound, the equivalent ratio of the lactone or lactam ring in component (b) to the lithium atom of component (c) is less than 1, preferably 0.5–0.75, more preferably greater than 0.5 and less than 0.65. The ratio greater than 0.5 and less than 0.6 is particularly preferable. In the determination of the equivalent ratio, 1 mole of a compound containing 1 lactone or lactam ring in a molecule is counted to be 2 equivalent; if 2 lactone or lactam rings are contained in a molecule, 1 mole of the compound is 4 equivalent.

When component (b) is an epoxy compound, the equivalent ratio of the epoxy group in component (b) to the lithium atom of component (c) is 0.5–2, preferably 1–1.5, and more preferably greater than 1 and less than 1.3. The ratio greater than 1 and less than 1.2 is particularly preferable. In the determination of the equivalent ratio, 1 mole of a compound containing 2 epoxy groups in a molecule is counted to be 2 equivalent; if 3 epoxy groups are contained in a molecule, 1 mole of the compound is 3 equivalent.

The molar ratio of component (a) and (d) is preferably greater than 1/20, more preferably 1/1–1/18, and most preferably ½–1/15. If the amount of component (d) is larger than 20 mole for 1 mole of component (a), the catalyst activity is lowered, making it difficult to produce highly hydrogenated polymers.

The amount of the catalyst composition of the present invention used in the hydrogenating of polymers is 0.005–50.0 mmol, as the amount of component (a), for 100 g of the polymer. The hydrogenating efficiency decreases if the amount is smaller than 0.005 mmol, while the amount exceeding 50.0 mmol is not only unnecessary and thus uneconomical, but also necessitates a complicated procedure for removing the catalyst residue from the polymer, even though the hydrogenation is possible using the higher amount of the catalyst composition. A more preferable range is 0.01–5 mmol, based on the amount of component (a), for 100 g of the polymer.

Polymers with a high degree of hydrogenation can be obtained by the use of the above catalyst composition independently from the conditions under which the catalyst is prepared or the conditions of hydrogenating system.

Included in the olefinically unsaturated polymers to be hydrogenated by the catalyst composition of the present invention are all polymers containing olefinically carboncarbon unsaturated double bonds in the polymer main chain or side chains. Typical examples are conjugated diene polymers and random, block, or graft polymers of conjugated diene and olefin.

Included in the above conjugated diene polymers are conjugated diene homopolymers and copolymers produced from conjugated dienes or from at least one conjugated diene and at least one olefin copolymerizable with the conjugated diene.

Given as typical examples of conjugated dienes used for the production of these conjugated diene polymers are conjugated dienes having 4-12 carbon atoms. Specific examples are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, and the like.

From the aspect of manufacturing elastomers having superior characteristics and industrial advantages, 1,3-butadiene and isoprene are particularly preferable. Elastomers, such as polybutadiene, polyisoprene, and butadiene/isoprene copolymers, are especially preferred polymer materials used in the present invention. There are no specific limitations as to the micro-structures of the polymers. All these polymers are suitable materials in the application of the hydrogenation using the catalyst composition of the present invention.

The above-mentioned copolymers produced from at least one conjugated diene and at least one olefin copolymerizable with the conjugated diene are also suitable polymer materials to which the hydrogenation using the catalyst composition of the present invention is applied.

The above-described conjugated diene monomers can be used for the manufacture of this type of copolymers. Any olefins copolymerizable with these conjugated dienes are usable for the manufacture of the copolymer, with vinylsubstituted aromatic hydrocarbons being particularly preferred.

Copolymers of conjugated dienes and vinyl-substituted aromatic hydrocarbons are of particular importance for the production of industrially useful and valuable elastomers or thermoplastic elastomers. Given as specific examples of vinyl-substituted aromatic hydrocarbons used in the manufacture of this type of copolymers are styrene, α-methylstyrene, p-methylstyrene, divinylbenzene, 1,1-diphenylethylene, N,N-dimethyl-p-aminoethylstyrene, N,N-diethyl-p-aminoethylstyrene, vinylpyridine, and the like. Of these styrene and α-methylstyrene are particularly preferable. Specific copolymers providing industrially valuable hydrogenated copolymers are butadiene/styrene copolymer, isoprene/styrene copolymer, butadiene/α-methylstyrene copolymer, and the like.

These copolymers include random copolymers in which monomers are randomly distributed throughout the polymers, progressively reducing block copolymers, complete block copolymers, and graft copolymers.

In order to manufacture industrially useful thermoplastic elastomers, a preferable amount of vinyl-substituted aromatic hydrocarbons is 5-95% by weight.

A content of vinyl bonds in the conjugated diene units of 10% or more of the total conjugated diene units is desirable for obtaining hydrogenated polymers with superior characteristics.

Included also in polymers which can be used in the hydrogenating process using the catalyst composition of the present invention are those of linear type, as well as branched type produced by coupling using a coupling agent and block type of radial or star-like configurations, all having a molecular weight, generally, of 1,000-1,000,000.

Specific examples of coupling agents used for the manufacture of the branched type polymers are divinylbenzene, tetrachlorosilane, methyldichlorosilane, butyltrichlorosilane, (dichloromethyl)trichlorosilane, (dichlorophenyl) trichlorosilane, 1,2-bis(trichlorosilyl)ethane, hexachlorosilane, 1,2,3,4,7,7-hexachloro-6-methyldichlorosilyl-2-norbornene, octachlorotrisiloxane, trichloromethyltrichlorosilane, tin tetrachloride, butyl tin trichloride, germanium tetrachloride, 1,2-dibromoethane, tolylene diisocyanate, and the like.

Beside the above compounds, polyketone compounds, polyaldehyde compounds, ester compounds, and polyepoxy compounds can be used as coupling agents. These coupling agents can be used as the both coupling agents and component (b) of the catalyst composition of the present invention. This ensures an economical advantage of the polymer hydrogenation using the catalyst composition of the present invention.

Also included in polymers used in the present invention are those having terminals modified with polarized groups by the living anion polymerization method or by other means. Hydroxy group, carboxyl group, ester group, isocyanate group, urethane group, amide group, urea group, thiourethane group, and the like are used as the polarized groups.

Beside the above-mentioned polymers, any polymers manufactured by any polymerization methods, e.g., anion polymerization, cation polymerization, coordination polymerization, radical polymerization, solution polymerization, emulsion polymerization, or the like, can be used in the present invention. In addition, cyclic olefin polymers manufactured by ring-opening polymerization using a metathesis catalyst, such as molybdenum, tungsten, or the like, are included in polymers having olefinically unsaturated bonds. Enumerated as specific examples of monomers constituting these polymers are cycloalkenes, such as cyclobutene, cyclopentene, cyclooctene, 1,5-cyclooctadine, 1,5,9-cyclododecatriene, norbornene, 5-methylnorbornene, and the like; norbornene derivatives, such as methyl 5-norbornene-2-carboxylate, ethyl 5-norbornene-2-carboxylate, phenyl 5-norbornene-2-carboxylate, methyl 2-methyl-5-norbornene-2-carboxylate, butyl 3-phenyl-5-norborene-2-carboxylate, dimethyl 5-norbornene-2,3-dicarboxylate, cyclohexyl 5-norbornene-2-carboxylate, allyl 5-norbornene-2-carboxylate, 5-norbornen-2-ylacetate, 5-norbornene-2-nitrile, 3-methyl-5-norbornene-2-nitrile, 2,3-dimethyl-5-norbornene-2,3-dinitrile, 5-norbornene-2-carboxylic acid amide, N-methyl-5-norbornene-2-carboxylic acid amide, N,N-diethyl-5-norbornene-2-carboxylic acid amide, N,N-dimethyl-2-methyl-5-norbornene-2,3-dicarboxylic acid amide, 5-norbornene-2,3-dicarboxylic acid anhydride, 2,3-dimethyl-5-norbornene-2,3-dicarboxylic acid imide, N-phenyl-2-methyl-5-norbornene-2,3-dicarboxylic acid imide, 5-methyl-5-carboxycyclohexylbicyclo[2.2.1]-2-heptene, 5-methyl-5-carboxy(4-t-butylcyclohexyl) bicyclo[2.2.1]-2-heptene, 5-methyl-5-carboxy(4-T-butylcyclohexyl)bicyclo[2.2.1]-2-heptene, 8-methyl-8-carboxycyclohexyltetracyclo[4.0.1$^{2.5}$1$^{7.10}$]-3-dodecene, 5-methyl-5-carboxytricyclo5.2.1.0$^{2.6}$]-decyl-8'-bicyclo[2.2.1]-2-heptene, and the like.

The catalyst composition of the present invention comprising (a) a bis(cyclopentadienyl) transition metal compound, (b) a polarized compound, and (c) an organic lithium compound, as well as the catalyst composition comprising, in addition to components (a), (b), and (c), a reducing organic metal compound, as component (d), exhibits a high hydrogenating activity with excellent reproducibility.

These catalyst components may be added to the reaction system admixed in advance or may be added separately in any arbitrary order. For example, component (b) may be added to a living polymer having lithium at its terminals for the reaction, and to the resulting reaction product may be added component (a) or a mixture of components (a) and (d), following which the hydrogenating reaction is initiated. Another example of carrying out the hydrogenation reaction is adding the reaction product of components (b) and (c), and adding, separately from this reaction product, component (a) or a mixture of components (a) and (d).

In the case where the components are mixed in advance, the mixing operation is desirably carried out under an inert atmosphere. The inert atmosphere used here means an atmosphere of nitrogen, helium, neon, argon, or the like wherein any substances do not react with any compounds involved in the hydrogenation reaction. Air and oxygen are not desirable, since oxygen may oxidize or deactivate the catalyst composition. Mixing of the catalyst components may be carried out also in a hydrogen atmosphere.

In the hydrogenation reaction using the catalyst composition of the present invention, the olefinically unsaturated polymers may be hydrogenated in a condition where they are dissolved in a hydrocarbon solvent, or the olefinically unsaturated polymers may be produced by polymerization in a hydrocarbon solvent and may be successively hydrogenated.

Hydrocarbon solvents used in the hydrogenation reaction may be aliphatic hydrocarbons, e.g., pentane, hexane, heptane, octane, etc.; alicyclic hydrocarbons, e.g., cyclopentane, methyl cyclopentane, cyclohexane, etc.; or aromatic hydrocarbons, e.g., benzene, toluene, xylene, ethylbenzene, etc. These hydrocarbon solvents may contain 20% by weight or a smaller amount of ethers such as diethyl ether, tetrahydrofuran, dibutyl ether, and the like.

There are no restrictions as to the concentration of polymers in carrying out the hydrogenation reaction of the present invention. Usually, the polymer concentration is 1-30% by weight, and preferably 3-20% by weight. The hydrogenation reaction is effected, after the addition of the hydrogenation catalyst composition under an inert gas atmosphere, e.g., in nitrogen or argon, or under a hydrogen atmosphere, by supplying hydrogen of a pressure of 1-100 kg/cm$^2$, with or without stirring while maintaining the temperature of the polymer solution at a specified temperature.

The pressure employed for the hydrogenation reaction is preferably 1-100 kg/cm$^2$.G, and preferably 4-20 kg/cm$^2$.G. If the pressure is below 1 kg/cm$^2$.G, the rate of hydrogenation is retarded; while if it is higher than 100 kg/cm$^2$.G, polymer may be gelled or undesired side reactions may occur.

A temperature suitable for the hydrogenation reaction is 0°-150° C. A temperature lower than 0° C. is uneconomical, since at a temperature lower than 0° C. not only the catalyst activity is lowered, but also the rate of hydrogenation is retarded. If the temperature is higher than 150° C., on the other hand, not only the polymers tend to decompose or gelled, but also aromatic rings are hydrogenated at the same time, leading to a poor hydrogenation selectivity. A more preferable temperature range is 20°-140° C., and particularly preferably 70°-130° C. In the hydrogenation reaction using the catalyst composition of the present invention, the reaction may be carried out at a comparatively higher temperature, resulting in a higher rate of reaction and a higher yield.

The hydrogenation reaction is carried out for a time period of 1 minutes to 10 hours. The larger the amount of the catalyst composition used and the higher the pressure, the reaction time may be shorter.

Either a batch reaction or a continuous reaction may be applicable to the hydrogenation reaction of the present invention.

The hydrogenation reaction according to the present invention produces polymers with 80% or more, preferably 90% of more, of olefinically unsaturated double bonds hydrogenated, but 5% or less double bonds in aromatic rings not saturated. Thus, double bonds in aromatic rings are substantially left unsaturated. Polymer molecules are hardly cut by the hydrogenation reaction of the present invention.

According to the present invention unsaturated double bonds in polymers can be hydrogenated in any arbitrary amount.

In addition, the catalyst composition of the present invention can be used for hydrogenating olefins such as styrene.

The hydrogenated polymers produced by the manner as described above can be separated from the polymer mixture by various processes; e.g., a process comprising removing the catalyst residue from the polymer solution, adding an antioxidant, pouring the polymer solution into hot water together with steam, and recovering the polymer clump by removing the solvent by means of steam distillation; a process comprising flowing the polymer solution onto a heated roll to evaporate the solvent and recover the polymer; a process comprising pouring the polymer solution into a polarized solvent such as alcohol or acetone to recover the polymer as precipitate; or the like.

In the process of hydrogenating polymers according to the present invention only a small amount of the catalyst residue remains in the reaction product, since only a small amount of the catalyst is required for the hydrogenation reaction. In addition, since the catalyst residue exhibits only a slight effect on the weatherability and heat resistance of the polymer, it is even possible to eliminate a step for removing the catalyst residue.

Drawbacks in conventional homogeneous hydrogenating catalysts have been greatly improved according to the present invention. The catalyst composition of the present invention, to which a bis(cyclopentadienyl) transition metal compound and a polarized compound are added, is not affected by impurities in the reaction system and exhibits a high hydrogenating activity, constantly producing polymers of a high hydrogenation degree at a high rate.

Other features of the invention will become apparent in the course of the following description of the exemplary embodiments which are given for illustration of the invention and are not intended to be limiting thereof. In the Examples, vinyl bond contents of conjugated diene polymers were determined by the Hampton method [R. R. Hampton, Anal. Chem., 29, 923 (1949)]using IR spectra.

EXAMPLES

Example 1

5 kg of cyclohexane and 1 kg of 1,3-butadiene were charged into a 10 1 autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 2.7 g of benzophenone was added and the mixture was stirred for 10 minutes. Absence of lithium at polymer terminals as a living anion was confirmed by the color change in the polymer liquid. Then, 0.40 g of bis(cyclopentadienyl) titanium dichloride and 1.16 g of diethyl aluminum chloride dissolved in 10 ml of toluene, which had been blended in advance under a nitrogen atmosphere, were charged and stirred, followed by feeding of hydrogen gas at a pressure of 8 kg/cm$^2$.G to effect the hydrogenation reaction at 90° C. The mixture was reacted for 2 hours, although hydrogen absorption almost terminated in 40 minutes. The rate of hydrogenation of the hydrogenated polymer thus produced was 99%, with a 1,2-vinyl bond content before hydrogenation being 38%. The polymer had a number average molecular weight of 100,000.

Comparative Example 1

The hydrogenation reaction was carried out in the same manner as in Example 1, except that the addition of benzophenone was omitted. The rate of hydrogenation of the hydrogenated polymer was 54%.

Example 2

5 kg of cyclohexane, 300 g of styrene, and 700 g of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 0.63 g of benzyl chloride was added and the mixture was stirred for 10 minutes. Absence of lithium at polymer terminals as a living anion was confirmed by the color change in the polymer liquid. The polymer produced at this point of time had a number average molecular weight of 290,000. 100 g of styrene was further added to confirm that no color reaction by styryl lithium occurred and no changes in the molecular weight distribution took place before and after the addition of styrene.

Then, 2.7 g of benzopheneone dissolved in 20 ml of cyclohexane and 0.93 g of n-butyl lithium, which had been reacted for 20 minutes in advance under a nitrogen atmosphere, were charged, followed by addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 90° C. for 2.5 hours, while feeding hydrogen gas at a pressure of 8 kg/cm$^2$.G. The rate of hydrogenation of the hydrogenated polymer thus produced was 99%, with a 1,2-vinyl bond content before hydrogenation being 36%. Nonoccurrence of benzene ring hydrogenation was confirmed by NMR.

Comparative Example 2

After polymerization in the same manner as in Example 2, the hydrogenation reaction was carried out in the same manner as in Example 2, without the addition of benzyl chloride, but adding 0.59 g of n-butyl lithium and a mixture of 0.36 g of bis(cyclopentadienyl) titanium dichloride and 1.57 g of diethyl aluminum chloride dissolved in 10 ml of toluene, which had been blended in advance under a nitrogen atmosphere. The rate of hydrogenation of the hydrogenated polymer was 58%.

Example 3

The hydrogenation reaction was carried out in the same manner as in Example 1, except that 1.66 g of acetophenone was used instead of 2.7 g of benzophenone. The rate of hydrogenation of the hydrogenated polymer was 96%.

Example 4

Polymerization was carried out in the same manner as in Example 1. The living Li value was measured at a conversion rate of about 100% to find that the value was 13.3 mmol.

0.8 g of acetone was added and the mixture was stirred for 10 minutes. Absence of lithium at polymer terminals as a living anion was confirmed by the color change in the polymer liquid. Then, 0.57 g of bis(cyclopentadienyl) titanium dibenzyl dissolved in 10 ml of toluene was charged and stirred. The hydrogenation reaction was carried out at 90° C. for 2.5 hours, while feeding hydrogen gas at a pressure of 8 kg/cm$^2$.G. The rate of hydrogenation of the hydrogenated polymer thus produced has 97%, with a 1,2-vinyl bond content before hydrogenation being 37%. The polymer had a number average molecular weight of 105,000.

Example 5

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 2.56 g of benzophenone was added and the mixture was stirred for 10 minutes. Absence of lithium at polymer terminals as a living anion was confirmed by the color change in the polymer liquid. Then, 0.13 g of n-butyl lithium and a mixture of 0.42 g of bis(cyclopentadienyl) titanium dichloride and 1.22 g of diethyl aluminum chloride dissolved in 10 ml of toluene, which had been blended in advance under a nitrogen atmosphere, were charged and stirred. The hydrogenation reaction was carried out at 90° C. for 4 hours, while feeding hydrogen gas at a pressure of 8 kg/cm$^2$.G. The rate of hydrogenation of the hydrogenated polymer thus produced was 94%, with a 1,2-vinyl bond content before hydrogenation being 39%. The polymer had a number average molecular weight of 100,000.

Example 6

5 kg of cyclohexane, 300 g of styrene, and 700 g of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.5 mmol. Then, 0.71 g of acetone and a mixture of 0.36 g of bis(cyclopentadienyl) titanium dichloride and 1.05 g of diethyl aluminum chloride dissolved in 10 ml of toluene, which had been blended in advance under a nitrogen atmosphere, were charged and stirred. The hydrogenation reaction was carried out at 90° C. for 3 hours, while feeding hydrogen gas at a pressure of 8 kg/cm$^2$.G. The rate of hydrogenation of the hydrogenated polymer thus produced was 93%, with a 1,2-vinyl bond content before hydrogenation being 36%. The polymer had a number average molecular weight of 95,000.

Example 7

Polymerization was carried out in the same manner as in Example 1. The living Li value was measured at a conversion rate of about 100% to find that the value was 13.5 mmol.

1.08 g of dibenzoyl methane and a mixture of 0.40 g of bis(cyclopentadienyl) titanium dichloride and 1.16 g of diethyl aluminum chloride dissolved in 10 ml of toluene, which had been blended in advance under a nitrogen atmosphere, were charged and stirred. The hydrogenation reaction was carried out at 90° C. for 3 hours, while feeding hydrogen gas at a pressure of 8 kg/cm$^2$·G. The rate of hydrogenation of the hydrogenated polymer thus produced was 92%, with a 1,2-vinyl bond content before hydrogenation being 37%. The polymer had a number average molecular weight of 95,000.

Example 8

Polymerization was carried out in the same manner as in Example 1. The living Li value was measured at a conversion rate of about 100% to find that the value was 13.4 mmol.

0.58 g of acetone and 0.43 g of bis(cyclopentadienyl) titanium benzyl dissolved in 10 ml of toluene were charged and stirred. The hydrogenation reaction was carried out at 90° C. for 3 hours, while feeding hydrogen gas at a pressure of 8 kg/cm$^2$·G. The rate of hydrogenation of the hydrogenated polymer thus produced was 93%, with a 1,2-vinyl bond content before hydrogenation being 38%. The polymer had a number average molecular weight of 100,000.

Example 9

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.3 mmol. 1.59 g of 2-hydroxy-4methoxybenzophenone was added and the mixture was stirred for 10 minutes. Absence of lithium at polymer terminals as a living anion was confirmed by the color change in the polymer liquid. Then, 0.40 g of bis(cyclopentadienyl) titanium dichloride and 1.16 g of diethyl aluminum chloride dissolved in 10 ml of toluene, which had been reacted in advance under a nitrogen atmosphere, were charged and stirred, followed by feeding of hydrogen gas at a pressure of 8 kg/cm$^2$·G to effect the hydrogenation reaction at 90° C. The mixture was reacted for 2.5 hours, although hydrogen absorption almost terminated in 45 minutes. The rate of hydrogenation of the hydrogenated polymer thus produced was 99%, with a 1,2-vinyl bond content before hydrogenation being 39%. The polymer had a number average molecular weight of 100,000.

Example 10

5 kg of cyclohexane, 300 g of styrene, and 700 g of 1,3-butadiene were charged into a 10 l autoclave, which had been degasified and dehydrated. After the addition of 200 g of tetrahydrofuran and 0.55 g of n-butyl lithium, the temperature was raised above 50° C. to initiate the polymerization. The living Li value was measured at a conversion rate of about 100% to find that the value was 4.8 mmol. 0.82 g of 2-hydroxy-4-n-octyloxybenzophenone was added and the mixture was stirred for 10 minutes. Absence of lithium at polymer terminals as a living anion was confirmed by the color change in the polymer liquid. Then, 1.26 g of 2-hydroxy-4-n-octyloxybenzophenone dissolved in 20 ml of cyclohexane and 0.47 g of n-butyl lithium, which had been reacted for 20 minutes in advance under a nitrogen atmosphere, and 0.36 g of bis(cyclopentadienyl) titanium dichloride and 1.05 g of diethyl aluminum chloride dissolved in 10 ml of toluene, which had been blended in advance under a nitrogen atmosphere, were charged and stirred. The hydrogenation reaction was carried out at 90° C. for 2.5 hours, while feeding hydrogen gas at a pressure of 8 kg/cm$^2$·G. The rate of hydrogenation of the hydrogenated polymer thus produced was 96%, with a 1,2-vinyl bond content before hydrogenation being 79%. The polymer had a number average molecular weight of 300,000.

Comparative Example 3

After polymerization in the same manner as in Example 10, the hydrogenation reaction was carried out in the same manner as in Example 10, without the addition of 2-hydroxy-4-n-octyloxybenzophenone, but adding 0.45 g of n-butyl lithium and a mixture of 0.36 g of bis(cyclopentadienyl) titanium dichloride and 1.05 g of diethyl aluminum chloride dissolved in 10 ml of toluene, which had been blended in advance under a nitrogen atmosphere. The rate of hydrogenation of the hydrogenated polymer was 56%.

Example 11

Polymerization was carried out in the same manner as in Example 1. The living Li value was measured at a conversion rate of about 100% to find that the value was 13.4 mmol.

2.27 g of 2-hydroxy-4-n-octyloxybenzophenone was added and the mixture was stirred for 10 minutes. Absence of lithium at polymer terminals as a living anion was confirmed by the color change in the polymer liquid. Then, 0.57 g of bis(cyclopentadienyl) titanium dibenzyl dissolved in 10 ml of toluene was charged and stirred. The hydrogenation reaction was carried out at 90° C. for 2.5 hours, while feeding hydrogen gas at a pressure of 8 kg/cm$^2$·G. The rate of hydrogenation of the hydrogenated polymer thus produced was 98%, with a 1,2-vinyl bond content before hydrogenation being 39%. The polymer had a number average molecular weight of 95,000.

Example 12

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 1.46 g of 2-hydroxy-4-n-octyloxybenzophenone was added and the mixture was stirred for 10 minutes. Absence of lithium at polymer terminals as a living anion was confirmed by the color change in the polymer liquid. Then, 0.20 g of n-butyl lithium and a mixture of 0.40 g of bis(cyclopentadienyl) titanium chloride and 1.16 g of diethyl aluminum chloride dissolved in 10 ml of toluene, which had been blended in advance under a nitrogen atmosphere, were added and stirred. The hydrogenation reaction was then carried out at 90° C. for 3 hours, while feeding hydrogen gas at a pressure of 8 kg/cm²·G. The rate of hydrogenation of the hydrogenated polymer thus produced was 94%, with a 1,2-vinyl bond content before hydrogenation being 41%. The polymer had a number average molecular weight of 100,000.

Example 13

5 kg of cyclohexane, 300 g of styrene, and 700 g of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 1.92 g of 2-hydroxy-4-n-octyloxybenzophenone and 0.13 g of n-butyl lithium were added and the mixture was stirred for 20 minutes. Then, 0.53 g of bis(cyclopentadienyl) titanium dibenzyl was charged and the hydrogenation reaction was carried out at 90° C. for 4 hours, while feeding hydrogen gas at a pressure of 8 kg/cm²·G. The rate of hydrogenation of the hydrogenated polymer thus produced was 92%, with a 1,2-vinyl bond content before hydrogenation being 39%. The polymer had a number average molecular weight of 97,000.

Example 14

Polymerization was carried out in the same manner as in Example 1. The living Li value was measured at a conversion rate of about 100% to find that the value was 13.4 mmol.

1.02 g of diacetone alcohol and 0.49 g of n-butyl lithium were added. After further addition of 0.52 g of bis(cyclopentadienyl) titanium dicloride and 1.51 g of diethyl aluminum chloride dissolved in 10 ml of toluene, which had been blended in advance under a nitrogen atmosphere, the mixture was stirred and the hydrogenation reaction was carried out at 90° C. for 4 hours, while feeding hydrogen gas at a pressure of 8 kg/cm²·G. The rate of hydrogenation of the hydrogenated polymer thus produced was 94%, with a 1,2-vinyl bond content before hydrogenation being 40%. The polymer had a number average molecular weight of 100,000.

Example 15

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 0.24 g of water was added and the mixture was stirred for 10 minutes. Absence of lithium at polymer terminals as a living anion was confirmed by the color change in the polymer liquid. The polymer produced at this point of time had a number average molecular weight of 100,000. 100 g of styrene was further added to confirm that no color reaction by styryl lithium occurred and no changes in the molecular weight distribution took place before and after the addition of styrene.

Then, 1.9 g of benzaldehyde and 1.1 g of n-butyl lithium, which had been reacted in advance under a nitrogen atmosphere, were charged, followed by further addition of 0.40 g of bis(cyclopentadienyl) titanium dichloride and 1.16 g of diethyl aluminum chloride dissolved in 10 ml of toluene, which had been blended in advance under a nitrogen atmosphere. After stirring, the hydrogenation reaction was carried out at 70° C., while feeding hydrogen gas at a pressure of 8 kg/cm²·G. The mixture was reacted for 4 hours, although hydrogen absorption almost terminated in 60 minutes. The rate of hydrogenation of the hydrogenated polymer thus produced was 99%, with a 1,2-vinyl bond content before hydrogenation being 38%.

Example 16

5 kg of cyclohexane, 300 g of styrene, and 700 g of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 94 mg of water was added and the mixture was stirred for 10 minutes. Absence of lithium at polymer terminals as a living anion was confirmed by the color change in the polymer liquid. The polymer produced at this point of time had a number average molecular weight of 290,000. 100 g of styrene was further added to confirm that no color reaction by styryl lithium occurred and no changes in the molecular weight distribution took place before and after the addition of styrene.

Then, 1.46 g of benzaldehyde dissolved in 20 ml of cyclohexane and 0.93 g of n-butyl lithium, which had been reacted for 20 minutes in advance under a nitrogen atmosphere, were charged, followed by further addition of 0.36 g of bis(cyclopentydienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feeding hydrogen gas at a pressure of 8 kg/cm²·G. The rate of hydrogenation of the hydrogenated polymer thus produced was 95%, with a 1,2-vinyl bond content before hydrogenation being 36%. Nonoccurrence of benzene ring hydrogenation was confirmed by NMR.

Comparative Example 4

After polymerization in the same manner as in Example 16, the hydrogenation reaction was carried out in the same manner as in Example 16, without the addition of water, but adding 0.59 g of n-butyl lithium and a mixture of 0.36 g of bis(cyclopentadienyl) titanium dichloride and 1.57 g of diethyl aluminum chloride dissolved in 10 ml of toluene, which had been blended in advance under a nitrogen atmosphere. The rate of hydrogenation of the hydrogenated polymer was 50%.

Example 17

5 kg of cyclohexane, 300 g of styrene, and 700 g of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 94 mg of water was added and the mixture was stirred for 10 minutes. Absence of lithium at polymer terminals as a living anion was confirmed by the color change in the polymer liquid. The polymer produced at this point of time had a number average molecular weight of 290,000. 100 g of styrene was further added to confirm that no color reaction by styryl lithium occurred and no changes in the molecular weight distribution took place before and after the addition of styrene.

Then, 0.93 g of benzaldehyde dissolved in 20 ml of cyclohexane and 0.93 g of n-butyl lithium, which had been reacted for 20 minutes in advance under a nitrogen atmosphere, were charged, followed by further addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feeding hydrogen gas at a pressure of 8 kg/cm$^2$·G. The rate of hydrogenation of the hydrogenated polymer thus produced was 60%, with a 1,2-vinyl bond content before hydrogenation being 36%. Nonoccurrence of benzene ring hydrogenation was confirmed by NMR.

Example 18

The hydrogenation reaction was carried out in the same manner as in Example 17, except that the amount of benzaldehyde added was 2.47 g instead of 0.93 g in Example 17. The rate of hydrogenation of the hydrogenated polymer was 90%.

Example 19

The hydrogenation reaction was carried out in the same manner as in Example 16, except that 0.93 g of propionaldehyde was used instead of 1.46 g of benzaldehyde. The rate of hydrogenation of the hydrogenated polymer was 99%.

Example 20

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 45° C. to initiate the polymerization. The living Li value was measured at a conversion rate of about 100% to find that the value was 13.7 mmol. 0.25 g of water was added and the mixture was stirred for 10 minutes. Absence of lithium at polymer terminals as a living anion was confirmed by the color change in the polymer liquid. The polymer produced at this point of time had a number average molecular weight of 100,000. 100 g of styrene was further added to confirm that no color reaction by styryl lithium occurred and no changes in the molecular weight distribution took place before and after the addition of styrene.

Then, 0.8 g of ethyl acetate and 1.1 g of n-butyl lithium, which had been reacted in advance under a nitrogen atmosphere, were charged, followed by further addition of 0.40 g of bis(cyclopentadienyl) titanium dichloride and 1.16 g of diethyl aluminum chloride dissolved in 10 ml of toluene, which had been blended in advance under a nitrogen atmosphere. After stirring, the hydrogenation reaction was carried out at 70° C., while feeding hydrogen gas at a pressure of 8 kg/cm$^2$·G. The mixture was reacted for 4 hours, although hydrogen absorption almost terminated in 70 minutes. The rate of hydrogenation of the hydrogenated polymer thus produced was 99%, with a 1,2-vinyl bond content before hydrogenation being 42%.

Example 21

5 kg of cyclohexane, 300 g of styrene, and 700 g of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 94 mg of water was added and the mixture was stirred for 10 minutes. Absence of lithium at polymer terminals as a living anion was confirmed by the color change in the polymer liquid. The polymer produced at this point of time had a number average molecular weight of 290,000. 100 g of styrene was further added to confirm that no color reaction by styryl lithium occurred and no changes in the molecular weight distribution took place before and after the addition of styrene.

Then, 0.61 g of ethyl acetate dissolved in 20 ml of cyclohexane and 0.93 g of n-butyl lithium, which had been reacted for 20 minutes in advance under a nitrogen atmosphere, were charged, followed by further addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feeding hydrogen gas at a pressure of 8 kg/cm$^2$·G. The rate of hydrogenation of the hydrogenated polymer thus produced was 93%, with a 1,2-vinyl bond content before hydrogenation being 38%. Nonoccurrence of benzene ring hydrogenation was confirmed by NMR.

Example 22

5 kg of cyclohexane, 300 g of styrene, and 700 g of 1,3-butadiene were charged into a 10 l autoclave, which had been degasified and dehydrated After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 94 mg of water was added and the mixture was stirred for 10 minutes. Absence of lithium at polymer terminals as a living anion was confirmed by the color change in the polymer liquid. The polymer produced at this point of time had a number average molecular weight of 295,000. 100 g of styrene was further added to confirm that no color reaction by styryl lithium occurred and no changes in the molecular weight distribution took place before and after the addition of styrene.

Then, 0.39 g of ethyl acetate dissolved in 20 ml of cyclohexane and 0.93 g of n-butyl lithium, which had been reacted for 20 minutes in advance under a nitrogen atmosphere, were charged, followed by further addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feedinq hydrogen gas at a pressure of 8 kg/cm$^2$·G. The rate of hydrogenation of the hydrogenated polymer thus produced was 59%, with a 1,2vinyl bond content before hydrogenation being 37%. Nonoccurrence of benzene ring hydrogenation was confirmed by NMR.

Example 23

The hydrogenation reaction was carried out in the same manner as in Example 22, except that the amount of ethyl acetate added was 1.03 g instead of 0.39 g in Example 22. The rate of hydrogenation of the hydrogenated polymer was 92%.

Example 24

The hydrogenation reaction was carried out in the same manner as in Example 21, except that 1.20 g of ethyl benzoate was used instead of 0.39 g of ethyl acetate. The rate of hydrogenation of the hydrogenated polymer was 99%.

Example 25

5 kg of cyclohexane, 300 g of styrene, and 700 g of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.9 mmol. 0.63 g of $\gamma$-butyrolactone was added and the mixture was stirred for 30 minutes. Absence of lithium at polymer terminals as a living anion was confirmed by the color change in the polymer liquid. The polymer produced at this point of time had a number average molecular weight of 96,000. 100 g of styrene was further added to confirm that no color reaction by styryl lithium occurred and no changes in the molecular weight distribution took place before and after the addition of styrene.

Then, 0.36 g of bis(cyclopentadienyl) titanium dichloride and 1.31 g of diethyl aluminum chloride dissolved in 10 ml of toluene, which had been blended in advance under a nitrogen atmosphere, were added and stirred. The hydrogenation reaction was carried out at 80° C. for 3 hours, while feeding hydrogen gas at a pressure of 9.0 kg/cm$^2$·G. The rate of hydrogenation of the hydrogenated polymer thus produced was 99%, with a 1,2-vinyl bond content before hydrogenation being 40%.

Example 26

5 kg of cyclohexane and 1 kg of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.3 mmol. 95 mg of water was added and the mixture was stirred for 10 minutes. Absence of lithium at polymer terminals as a living anion was confirmed by the color change in the polymer liquid. The polymer produced at this point of time had a number average molecular weight of 290,000. 100 g of styrene was further added to confirm that no color reaction by styryl lithium occurred and no changes in the molecular weight distribution took place before and after the addition of styrene.

Then, 0.86 g of $\gamma$-butyrolactone dissolved in 20 ml of cyclohexane and 1.23 g of n-butyl lithium, which had been reacted for 20 minutes in advance under a nitrogen atmosphere, were added, followed by further addition of 0.52 g of bis(cyclopentadienyl) titanium dichloride and 1.51 g of diethyl aluminum chloride dissolved in 10 ml of toluene, which had been blended in advance under a nitrogen atmosphere. The mixture was stirred and the hydrogenation reaction was carried out at 80° C. for 4 hours, while feeding hydrogen gas at a pressure of 9.0 kg/cm$^2$·G. The rate of hydrogenation of the hydrogenated polymer thus produced was 98%, with a 1,2-vinyl bond content before hydrogenation being 39%.

Example 27

The hydrogenation reaction was carried out in the same manner as in Example 26, except that the amount of $\gamma$-butyrolactone used was 0.77 g. The rate of hydrogenation of the hydrogenated polymer was 94%.

Example 28

The hydrogenation reaction was carried out in the same manner as in Example 26, except that 0.66 g of $\epsilon$-caprolactone was used instead of 0.86 g of $\gamma$-butyrolactone. The rate of hydrogenation of the hydrogenated polymer was 59%.

Example 29

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.2 mmol. 0.75 g of $\epsilon$-caprolactone was added and the mixture was stirred for 30 minutes. Absence of lithium at polymer terminals as a living anion was confirmed by the color change in the polymer liquid. The polymer produced at this point of time had a number average molecular weight of 102,000. 100 g of styrene was further added to confirm that no color reaction by styryl lithium occurred and no changes in the molecular weight distribution took place before and after the addition of styrene.

Then, 1.25 g of $\epsilon$-caprolactone and 0.56 g of n-butyl lithium, which had been reacted in advance under a nitrogen atmosphere, were added, followed by further addition of 0.52 g of bis(cyclopentadienyl) titanium dichloride and 1.88 g of diethyl aluminum chloride dissolved in 10 ml of toluene, which had been blended in advance under a nitrogen atmosphere. The mixture was stirred and the hydrogenation reaction was carried out at 80° C., while feeding hydrogen gas at a pressure of 8.0 kg/cm$^2$·G. The reaction was complete in 4 hours to obtain a hydrogenated polymer at a hydrogenation rate of 93%, with a 1,2-vinyl bond content before hydrogenation being 41%.

Example 30

The hydrogenation reaction was carried out in the same manner as in Example 26, except that 0.76 g of $\beta$-propiolactone was used instead of 0.86 g of $\gamma$-butyrolactone. The rate of hydrogenation of the hydrogenated polymer was 99%.

Example 31

5 kg of cyclohexane, 300 g of styrene, and 700 g of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.8 mmol. 0.59 g of 2-pyrrolidone was added and the mixture was stirred for 30 minutes.

Absence of lithium at polymer terminals as a living anion was confirmed by the color change in the polymer liquid. The polymer produced at this point of time had a number average molecular weight of 97,000. 100 g of styrene was further added to confirm that no color reaction by styryl lithium occurred and no changes in the molecular weight distribution took place before and after the addition of styrene.

Then, 0.36 g of bis(cyclopentadienyl) titanium dichloride and 1.31 g of diethyl aluminum chloride dissolved in 10 ml of toluene, which had been blended in advance under a nitrogen atmosphere, were added and the mixture was stirred. The hydrogenation reaction was carried out at 80° C. for 3 hours, while feeding hydrogen gas at a pressure of 9.0 kg/cm$^2$·G, to obtain a hydrogenated polymer at a hydrogenation rate of 99%, with a 1,2-vinyl bond content before hydrogenation being 39%.

Example 32

5 kg of cyclohexane and 1 kg of 1,3-butadiene were charged into a 10 l autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 95 mg of water was added and the mixture was stirred for 10 minutes. Absence of lithium at polymer terminals as a living anion was confirmed by the color change in the polymer liquid. The polymer produced at this point of time had a number average molecular weight of 291,000. 100 g of styrene was further added to confirm that no color reaction by styryl lithium occurred and no changes in the molecular weight distribution took place before and after the addition of styrene.

Then, 0.86 g of 2-pyrrolidone dissolved in 20 ml of cyclohexane and 1.23 g of n-butyl lithium, which had been reacted for 20 minutes in advance under a nitrogen atmosphere, were added, followed by further addition of 0.52 g of bis(cyclopentadienyl) titanium dichloride and 1.51 g of diethyl aluminum chloride dissolved in 10 ml of toluene, which had been blended in advance under a nitrogen atmosphere. The mixture was stirred and the hydrogenation reaction was carried out at 80° C. for 4 hours, while feeding hydrogen gas at a pressure of 9.0 kg/cm$^2$·G, to obtain a hydrogenated polymer at a hydrogenation rate of 98%, with a 1,2-vinyl bond content before hydrogenation being 41%.

Example 33

The hydrogenation reaction was carried out in the same manner as in Example 32, except that the amount of 2-pyrrolidone used was 1.03 g. The rate of hydrogenation of the hydrogenated polymer was 93%.

Example 34

The hydrogenation reaction was carried out in the same manner as in Example 32, except that 0.66 g of ε-caprolactam was used instead of 0.86 g of 2-pyrrolidone. The rate of hydrogenation of the hydrogenated polymer was 61%.

Example 35

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 0.48 g of β-propiolactam was added and the mixture was stirred for 30 minutes. Absence of lithium at polymer terminals as a living anion was confirmed by the color change in the polymer liquid. The polymer produced at this point of time had a number average molecular weight of 100,000. 100 g of styrene was further added to confirm that no color reaction by styryl lithium occurred and no changes in the molecular weight distribution took place before and after the addition of styrene.

Then, 0.76 g of β-propiolactam and 0.56 g of n-butyl lithium, which had been reacted in advance under a nitrogen atmosphere, were added, followed by further addition of 0.52 g of bis(cyclopentadienyl) titanium dichloride and 1.88 g of diethyl aluminum chloride dissolved in 10 ml of toluene, which had been blended in advance under a nitrogen atmosphere. The mixture was stirred and the hydrogenation reaction was carried out at 80° C., while feeding hydrogen gas at a pressure of 9.0 kg/cm$^2$·G. The hydrogenation reaction was complete in 4 hours to obtain a hydrogenated polymer at a hydrogenation rate of 94%, with a 1,2-vinyl bond content before hydrogenation being 39%.

Example 36

The hydrogenation reaction was carried out in the same manner as in Example 32, except that 0.76 g of β-propiolactam was used instead of 0.86 g of 2-pyrrolidone. The rate of hydrogenation of the hydrogenated polymer was 99%.

Example 37

5 kg of cyclohexane and 1 kg of 1,3-butadiene were charged into a 10 l autoclave, which had been degasified and dehydrated. After the addition of 15 g of tetrahydrofuran and 1.1 g of n-butyl lithium, the temperature was raised above 50° C. to initiate the polymerization. The living Li value was measured at a conversion rate of about 100% to find that the value was 13.4 mmol. 0.24 g of water was added and the mixture was stirred for 10 minutes. Absence of lithium at polymer terminals as a living anion was confirmed by the color change in the polymer liquid. The polymer produced at this point of time had a number average molecular weight of 99,000. 100 g of styrene was further added to confirm that no color reaction by styryl lithium occurred and no changes in the molecular weight distribution took place before and after the addition of styrene.

Then, 3.8 g of 1,2-epoxytetradecane and 1.1 g of n-butyl lithium, which had been reacted in advance under a nitrogen atmosphere, were charged, followed by further addition of 0.40 g of bis(cyclopentadienyl) titanium dichloride and 1.16 g of diethyl aluminum chloride dissolved in 10 ml of toluene, which had been blended in advance under a nitrogen atmosphere. After stirring, the hydrogenation reaction was carried out at 70° C., while feeding hydrogen gas at a pressure of 8 kg/cm$^2$·G. The mixture was reacted for 4 hours, although hydrogen absorption almost terminated in 80 minutes. The rate of hydrogenation of the hydrogenated polymer thus produced was 99%, with a 1,2-vinyl bond content before hydrogenation being 39%.

Example 38

5 kg of cyclohexane, 300 g of styrene, and 700 g of 1,3-butadiene were charged into a 10 1 autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.1 mmol. 92 mg of water was added and the mixture was stirred for 10 minutes. Absence of lithium at polymer terminals as a living anion was confirmed by the color change in the polymer liquid. The polymer produced at this point of time had a number average molecular weight of 300,000. 100 g of styrene was further added to confirm that no color reaction by styryl lithium occurred and no changes in the molecular weight distribution took place before and after the addition of styrene.

Then, 2.92 g of 1,2-epoxytetradecane dissolved in 20 ml of cyclohexane and 0.93 g of n-butyl lithium, which had been reacted for 20 minutes in advance under a nitrogen atmosphere, were charged, followed by further addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feeding hydrogen gas at a pressure of 8 kg/cm$^2$·G The rate of hydrogenation of the hydrogenated polymer thus produced was 94%, with a 1,2-vinyl bond content before hydrogenation being 37%. Nonoccurrence of benzene ring hydrogenation was confirmed by NMR.

Example 39

5 kg of cyclohexane, 300 g of styrene, and 700 g of 1,3-butadiene were charged into a 10 1 autoclave, which had been degasified and dehydrated. After the addition of 15 g of tetrahydrofuran and 0.55 g of n-butyl lithium, the temperature was raised above 50° C. to initiate the polymerization. The living Li value was measured at a conversion rate of about 100% to find that the value was 5.2 mmol. 94 mg of water was added and the mixture was stirred for 10 minutes. Absence of lithium at polymer terminals as a living anion was confirmed by the color change in the polymer liquid. The polymer produced at this point of time had a number average molecular weight of 300,000. 100 g of styrene was further added to confirm that no color reaction by styryl lithium occurred and no changes in the molecular weight distribution took place before and after the addition of styrene.

Then, 1.86 g of 1,2-epoxytetradecane dissolved in 20 ml of cyclohexane and 0.93 g of n-butyl lithium, which had been reacted for 20 minutes in advance under a nitrogen atmosphere, were charged, followed by further addition of 0.36 g of bis(cyclopentadienyl) titanium dichloride and 1.05 g of diethyl aluminum chloride dissolved in 10 ml of toluene, which had been blended in advance under a nitrogen atmosphere. After stirring, the hydrogenation reaction was carried out at 70° C. for 4 hours, while feeding hydrogen gas at a pressure of 8 kg/cm$^2$·G. The rate of hydrogenation of the hydrogenated polymer thus produced was 58%, with a 1,2-vinyl bond content before hydrogenation being 38%. Nonoccurrence of benzene ring hydrogenation was confirmed by NMR.

Example 40

The hydrogenation reaction was carried out in the same manner as in Example 39, except that the amount of 1,2-epoxytetradecane added was 4.94 g instead of 1.86 g in Example 39. The rate of hydrogenation of the hydrogenated polymer was 91%.

Example 41

The hydrogenation reaction was carried out in the same manner as in Example 38, except that 0.93 g of propylene oxide was used instead of 2.92 g of 1,2-epoxytetradecane. The rate of hydrogenation of the hydrogenated polymer was 9%.

Obviously, numerous modifications and variations of the present invention are possible in light of the above teachings. It is therefore to be understood that within the scope of the appended claims, the invention may be practiced otherwise than as specifically described herein.

What is claimed is:

1. A catalyst composition for hydrogenating olefinically unsaturated polymers, which comprises:
   (a) a bis(cyclopentadienyl) transition metal compound represented by the following formula (1),

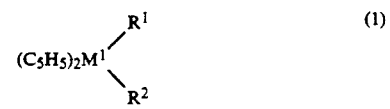

wherein $M^1$ is a transition metal selected from the group consisting of titanium, zirconium, and hafnium, $R^1$ and $R^2$ may be the same or different and each represents an alkyl group, aryl group, aralkyl group, alkoxy group, aryloxy group, carboxyl group, carbonyl group, β-diketone ordination group, or a halogen atom, and a reaction amount of (b) and (c) below:
   (b) at least one polarized compound selected from the group consisting of carbonyl group-containing compound and epoxy group-containing compounds, and
   (c) an organic lithium compound selected from the group consisting of methyl lithium, ethyl lithium, n-propyl lithium, n-butyl lithium, sec-butyl lithium, t-butyl lithium, n-hexyl lithium, phenyl lithium, p-tolyl lithium, xylyl lithium, 1,4-dilithiobutane, alkylene dilithium, a reaction product of butyl lithium and divinyl benzene and a living polymer having lithium at a terminal group of the polymer.

2. The catalyst composition according to claim 1 further comprising (d) a reducing organometal compound selected from the group consisting of aluminum compounds, zinc compounds, and magnesium compound.

3. The catalyst composition according to claim 1 wherein said component (b) is a ketone compound and wherein the amount of ketonic carbonyl group is greater than 1 equivalent for 1 equivalent of lithium atom in said component (c).

4. The catalyst composition according to claim 1, wherein said component (b) is a ketone compound containing hydroxyl group and wherein the total amount of hydroxyl group and ketonic carbonyl group in component (b) is greater than 1 equivalent for 1 equivalent of lithium atom in said component (c).

5. The catalyst composition according to claim 1, wherein said component (b) is an aldehyde compound and wherein the amount of aldehyde carbonyl group in component (b) is greater than 1 equivalent for 1 equivalent of lithium atom in said component (c).

6. The catalyst composition according to claim 1, wherein said component (b) is an ester compound and wherein the amount of ester group in component (b) is greater than 0.5 equivalent for 1 equivalent of lithium atom in said component (c).

7. The catalyst composition according to claim 1, wherein said component (b) is a lactone compound and wherein the amount of lactone ring in component (b) is greater than 0.5 equivalent for 1 equivalent of lithium atom in said component (c).

8. The catalyst composition according to claim 1, wherein said component (b) is a lactam compound and wherein the amount of lactam ring in component (b) is greater than 0.5 equivalent for 1 equivalent of lithium atom in said component (c).

9. The catalyst composition according to claim 1 wherein said component (b) is an epoxy compound and wherein the amount of epoxy group in component (b) is greater than 1 equivalent for 1 equivalent of lithium atom in said component (c).

* * * * *